Dec. 1, 1953 T. M. FERRILL, JR 2,661,070
VEHICLE SIGNALING
Filed July 19, 1946 3 Sheets-Sheet 1
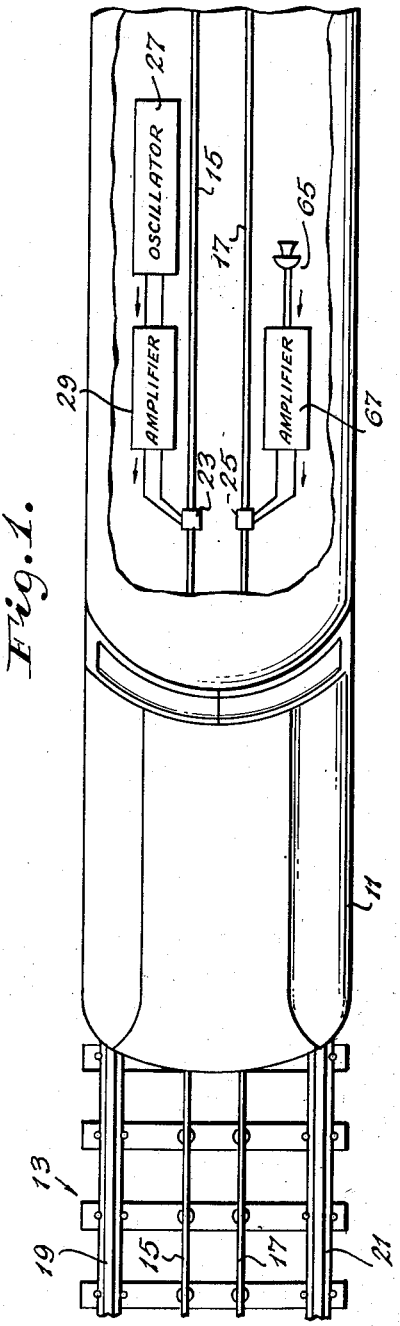
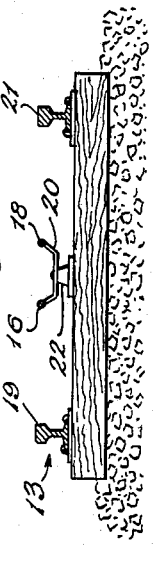
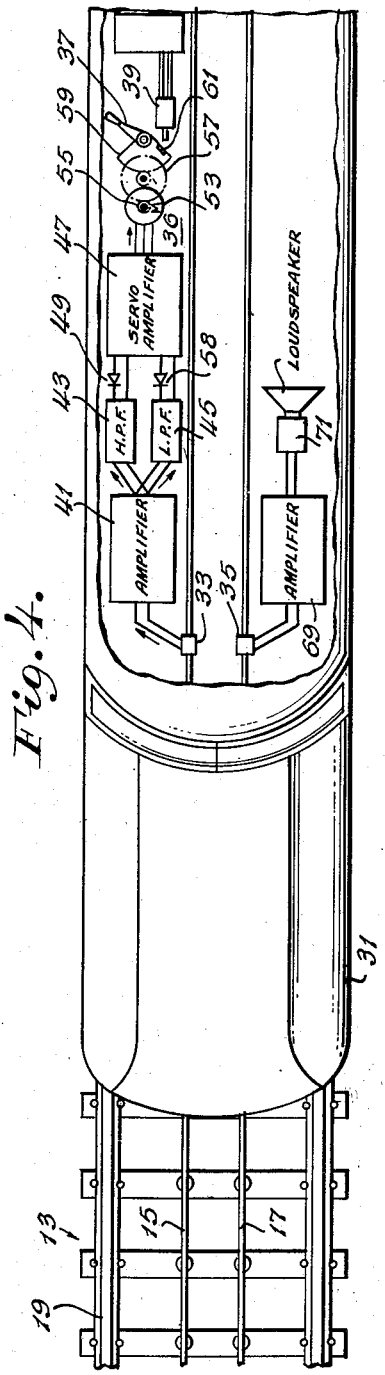
INVENTOR
Thomas M. Ferrill, Jr.

Dec. 1, 1953   T. M. FERRILL, JR   2,661,070
VEHICLE SIGNALING

Filed July 19, 1946   3 Sheets-Sheet 2

INVENTOR
Thomas M. Ferrill, Jr.

Dec. 1, 1953   T. M. FERRILL, JR   2,661,070
VEHICLE SIGNALING
Filed July 19, 1946   3 Sheets-Sheet 3

INVENTOR
Thomas M. Ferrill, Jr.

Patented Dec. 1, 1953

2,661,070

UNITED STATES PATENT OFFICE 2,661,070

VEHICLE SIGNALING

Thomas M. Ferrill, Jr., Garden City, N. Y.

Application July 19, 1946, Serial No. 684,633

11 Claims. (Cl. 180—77)

This invention relates primarily to vehicle signalling and is particularly concerned with the recording and reproducing of information in space-fixed relation along a vehicle path.

In U. S. patent application Serial No. 523,737, filed February 24, 1944, and issued January 10, 1950, as Patent No. 2,493,755, there is set forth a vehicle signalling system wherein alternate zones are fixed in concatenated relation along a path, the number of zones per unit length along the path being varied in inverse proportion to optimum vehicle speeds along successive parts of the path, and a vehicle equipped with a pickup device is operated along the path at varying speeds according to variation of frequency of an alternating signal produced by traversal of the successive zones along said path.

It is an object of the present invention to provide an improved vehicle signalling system.

This invention is directed toward the recording by a first vehicle travelling along a path, of signalling information to be reproduced on a vehicle subsequently travelling along the path, and toward the regulation of the performance of the second vehicle exactly in accordance with the variations of the performance of the first vehicle. Insofar as the speed variations of the second vehicle accurately duplicate those of the first, both as to the points along the path at which the vehicle is accelerated and decelerated and as to the magnitudes of vehicle speed and acceleration at all points, the present invention contemplates accurate tonal reproduction of signals as recorded by the first vehicle.

An alternating signal recorder fixed to the first vehicle impresses alternating signals upon a recording medium along the vehicle path, during movement of the vehicle along the path. The time-alternations of the signals are recorded as space-alternations along the path. The space period, or the length per cycle along a selected portion of the path, is dependent not only upon the frequency of the signal recorded but also upon the speed of the recorder-bearing vehicle.

Thereafter, operation along the path of a vehicle bearing a suitable reproducer for cooperation with the space-alternations results in a reconversion into time-alternating signals. Accurate duplication of the variations of speed of the recorder-bearing vehicle results in true reproduction of the tone or tones impressed on the recording medium or media, while too-fast or too-slow operation results in production of signals characterized by pitch too high or too low.

In order to provide for very accurate duplication by the subsequent vehicle of the performance along the path of the first vehicle, a recording is made to represent not only the performance of the first vehicle but also the manipulations of the controls thereof as required to effectuate its performance. In railway vehicles, this aspect of the present invention is limited to speed control features, while in steerable, variable-speed vehicles such as road motor vehicles, it is carried out in respect to steering as well as speed control. For speed reference, the recorder signal frequency is varied slightly upwardly with retraction of the vehicle motive power control, and downwardly with advancement of the vehicle motive power control. In a similar manner, where steerable vehicles are concerned, the recording, while being positioned generally along the course of movement of the vehicle, is deflected slightly to the right from the precise course of movement of the recorder vehicle as the steering control thereof is deflected to the right, and to the left as the steering control is deflected to the left.

Illustrative embodiments of the invention are shown in the appended drawings, wherein:

Fig. 1 is a schematic plan view of a railway vehicle equipped for recording signalling information along recording media during progress of the vehicle;

Figs. 2 and 3 are elevations, partly in section showing two selected arrangements of magnetic recording media along a railway;

Fig. 4 is a schematic plan view of a railway vehicle equipped for reproducing signals recorded along the railway, and for speed regulation of the vehicle in accordance with previously recorded speed signal data;

Figure 5:
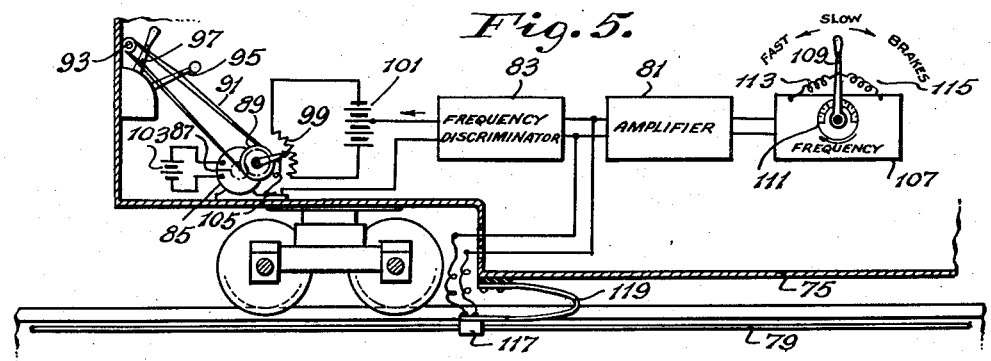
Figs. 5 and 6 are schematic views of railway vehicles equipped for so recording and relying upon speed control signals that the performance of the first vehicle is duplicated by the second.
Figure 6:
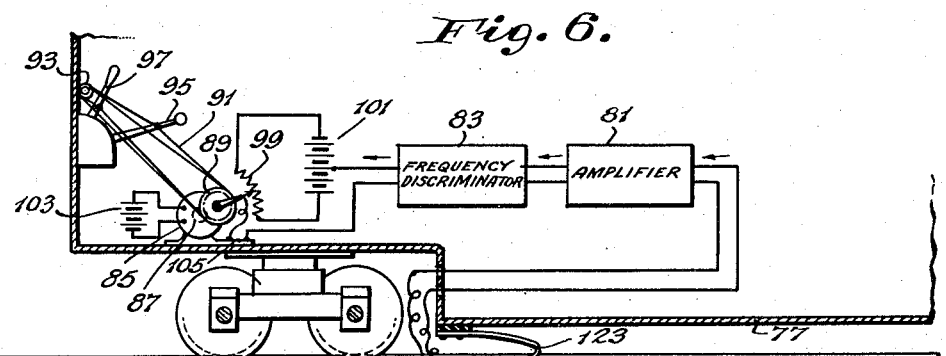
Figure 7:
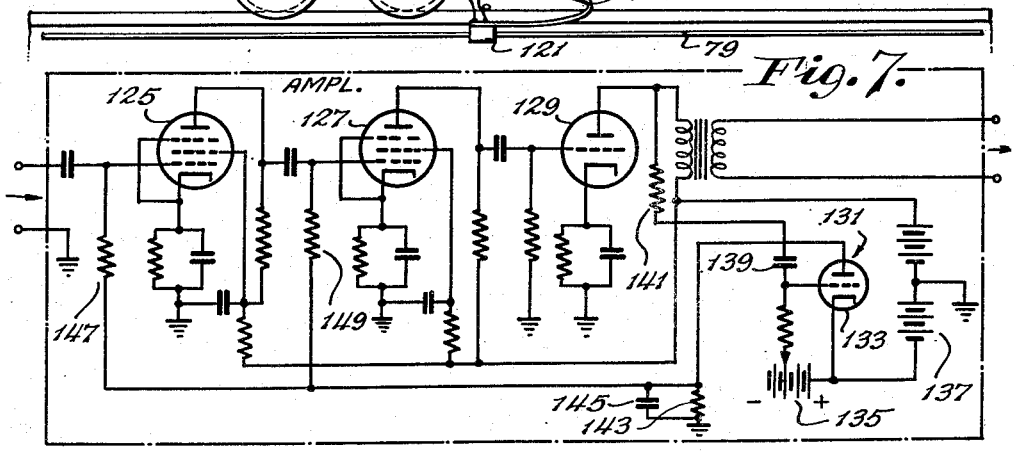
Figure 8:
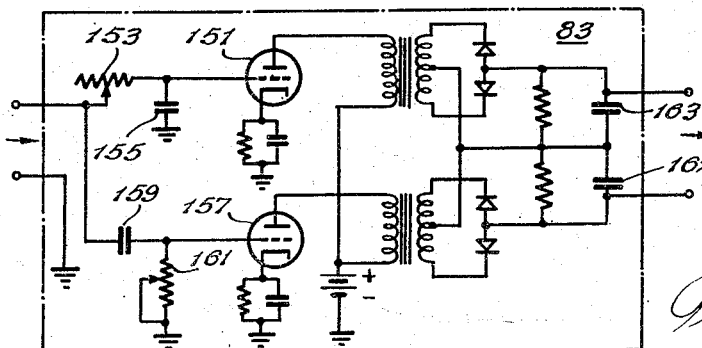
Figure 9:
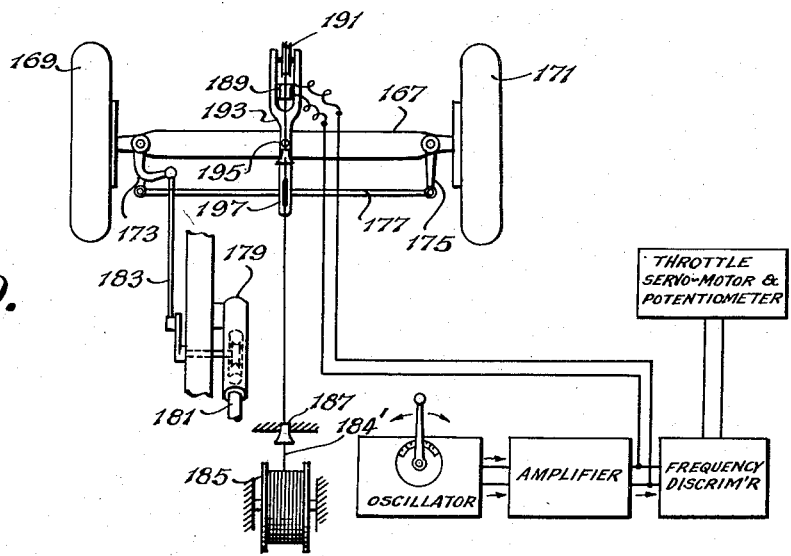
Figure 10:
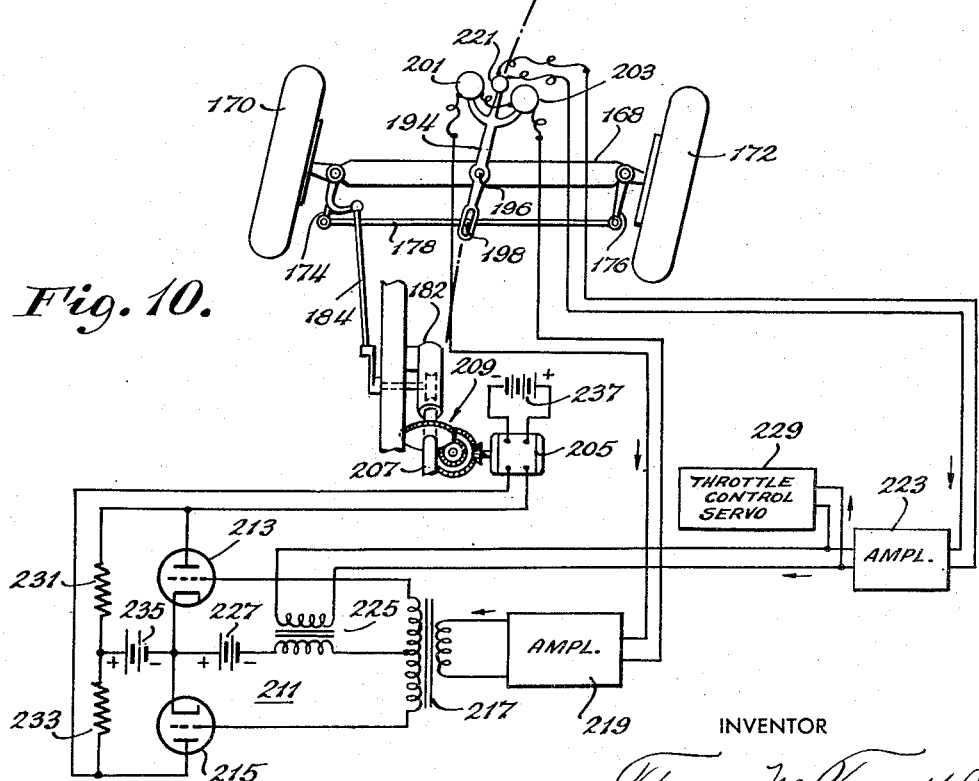

Figs. 7 and 8 are circuit diagrams of apparatus units shown in Figs. 5 and 6; and Figs. 9 and 10 are schematic views showing an application of features of the present invention to steerable vehicles such as automobiles.

Referring now to Fig. 1, a railway vehicle 11 is indicated upon a railway 13, along which extends a recording medium or a plurality of recording media, as for example, wires or strips 15 and 17 of material such as a ferrous substance receptive to magnetic recording. The recording media 15, 17 are illustrated in Fig. 1 as extending between the rails 19, 21, but they may be positioned in any convenient manner along the railway, as alongside or above the rails. Trolley units extend from the vehicle 11 for riding along the recording media. Upon these trolley units are carried magnetic recorder heads 23, 25 for subjecting the recording media to intense magnetic fields during progress of the vehicle 11 along the railway 13, to impress space alternations upon the recording media corresponding to time-alternations of recorder signals during movement of vehicle 11.

Magnetic recordings have heretofore been made upon and reproduced from metallic wires and tapes, the recording medium being driven at constant speed through a recorder head during the subjection of the recorder head to intense alternating signal currents, and being driven at an equal constant speed through a pickup head for faithful tonal reproduction. Representative instruments and techniques employed for this purpose are set forth in a paper by S. J. Begun entitled "Magnetic Recording and Some of Its Applications in the Broadcast Field," Proceedings of the I. R. E., vol. 29, page 423, August 1941. The elements described in the Begun paper, including recorder and pickup heads and recording media, are applicable to the present invention, the recording medium here being fixed along the vehicle path, and the relative motion between the recording medium and the recorder and pickup heads being provided by the vehicle movement along the path, the speed of this relative motion varying according to the vehicle speed.

Fig. 2 illustrates in vertical cross-section an arrangement of flat strips 15 and 17 as the recording media, supported by standards 12 and 14 stationed upon the cross-ties. Such strips are ideally suited for transverse polar recording.

Fig. 3 illustrates an arrangement between the rails 19 and 21 of ferrous wires 16 and 18 as the recording media, supported as by cross-brackets 20 upon standards 22. If small-diameter wires 16 and 18 are employed as the recording media, either transverse recording or longitudinal recording may be employed. Each of these methods is illustrated in the Begun paper, supra.

Referring again to Fig. 1, an oscillator or alternating signal generator 27 may be coupled to a trolley-borne recorder head 23, as through an amplifier 29, for producing a speed reference recording along the medium 15. The number $x$ of cycles per foot along the medium 15 is made to vary according to the quotient of the frequency $f$ of oscillator 27, expressed in cycles per second, and the speed $v$ of the vehicle 11, expressed in feet per second, the equation relating these factors being simply:

$$x = \frac{f}{v}$$

A vehicle 31 (Fig. 4) is thereafter operated along the railway 13, with pickup heads 33 and 35 trolley-borne therefrom for cooperation with the recording media 15 and 17, respectively. Pickup head 33 produces an alternating signal voltage of frequency $f'$ varying as the product of the speed $v'$ of vehicle 31 multiplied by $x$, the number of cycles per foot along the medium 15. Thus, the frequency $f'$ of the signal generated in pickup head 33 by the movement of the vehicle 31 is given by the equation:

$$f' = xv'$$

From a consideration of the two foregoing equations, it is apparent that $$\frac{f'}{f} = \frac{v'}{v}$$

and, accordingly, that any variance between the speeds of the subsequent vehicle 31 and the recording vehicle 11 is represented by variations of the picked-up frequency $f'$ above or below the recorded frequency $f$. Following the general principles set out in patent application Serial No. 523,737, the signal produced by pickup head 33 may be amplified and utilized through suitable servo mechanism 36 for controlling the speed control members, e. g., the throttle 37 and the brake control device 39 of the vehicle 31.

The servo mechanism 36 includes an amplifier 41 having its input terminals connected to the pickup head 33 and its output terminals connected to low-pass and high-pass filters 43 and 45. The output circuits of these filters are connected to the input circuit of a servo amplifier 47 through rectifiers 49 and 58, and the output circuit of the servo amplifier 47 controls a motor 53 according to the magnitude and rate of change of the difference of the rectified output voltages of the filters 43 and 45. The servo motor 53 is coupled, as through gear elements 55, 57 and 59 to the throttle 37, and a projection 61 on the gear element 59 may be arranged to actuate the brake control lever 39 as the closed-throttle position is reached by the gear element 59.

The high-pass and low-pass filters 43 and 45 are arranged to provide equal attenuations at the average frequency $f$ recorded through recorder head 23 during the traversal of the railway 13 by the recorder vehicle 11. Assume for the moment that the oscillator 27 remained adjusted to a fixed frequency during the traversal of railway 13 by vehicle 11. Insofar as the speed of the vehicle 31 varied along successive portions of the railway 13 in exact duplication of the prior performance therealong of the recorder vehicle 11, the signals rectified in rectifiers 49 and 58 and opposed in the servo amplifier 47 would be of equal strength, and the motor 53 would therefore remain inactive. But if the speed of the vehicle 31 should become excessive, the frequency of the signal developed in the pickup head 33 would be proportionately higher than the recorder frequency, and thus the signal passed through the high-pass filter 43 and rectifier 49 would be stronger than that passed through units 45 and 58, the differential signal supplied to the servo amplifier 47 being effective to operate the servo motor 53 in the direction to decelerate the vehicle 31. The speed displacement signal differential between the rectified filter output voltages would be modified in servo amplifier 47 according to its rate of change, with reinforcement of the operating voltage supplied to motor 53 when the differential input signal of servo amplifier 47 is increasing, and suppression of the motor operating voltage when the servo amplifier differential input signal is decreasing, as set forth in application Serial No. 523,737.

While the above discussion assumed fixed-frequency operation of oscillator 27, it will be readily apparent that the frequency of the oscillator may be varied somewhat above and below a predetermined average frequency, as for denoting throttle adjustment, as will appear more fully hereafter.

Auxiliary signals may be recorded along significant parts of the railway 13, e. g., at the approaches to stations or to hazardous zones, as by significant tones or by voice signals which may be employed through a microphone 65 and amplifier 67 (Fig. 1) for actuation of the recorder head 25 cooperating with recording medium 17. Pickup head 35 on vehicle 31 (Fig. 4) is coupled through an amplifier 69 to a transducer such as a loud-speaker 71 for reproducing the tones or warning signals at the correct points along the railway. The recording and reproduction of the auxiliary or warning signals is rendered capable of tonal fidelity by the control of speed of the second vehicle 31 according to that of the first vehicle 11, and such auxiliary signal provision is useful, in turn, as an adjunct to the speed duplication features. Even if musical tones are recorded through elements 65, 67, 25, and are reproduced through pickup head 35 and transducer 71, an indication of any error in the speed duplication performance is available through observance of resultant lack of fidelity or naturalness of the tones coming through transducer 71.

In Figs. 5 and 6 there are shown similar vehicles 75 and 77 arranged for operation along a path along which extends a recording medium 79. Vehicles 75 and 77 preferably are generally similar, and preferably have substantially duplicate throttle equipment and substantially duplicate characteristics as to variation of motive power with throttle position. In each of these vehicles, an amplifier 81 provided with an output amplitude limiter is connected to supply signal energy to a frequency discriminator 83, and the output circuit of the frequency discriminator is connected to actuate a servo motor 85. The servo motor 85 is coupled through speed reduction gears 87, 89 and a further connecting element, e. g. a belt or cord loop 91 passing through a return pulley 93 to the throttle lever 95. If desired, the servo motor 85 may be coupled also to the vehicle brake lever 97, as by a further belt or cord, portions of the belts or cords being elastic if desired. A potentiometer 99 energized by a voltage source 101 is connected in the circuit between the frequency discriminator 83 and the motor 85, and this potentiometer 99 is coupled to the motor 85, as through the throttle coupling members, for providing an output voltage varying as a predetermined function of the setting of the throttle lever 95. A fixed voltage source 103 may be connected to the motor 85 for supplying power to the armature thereof, and for inducing rotation of the motor rotor in a direction and at a speed dependent upon the polarity and magnitude of the resultant voltage applied to the motor field winding terminals 105, i. e., the difference between the voltages provided by potentiometer circuit 99, 101 and the frequency discriminator 83.

The connections between the frequency discriminator 83 and the servo motor 85 are so arranged that a reduction of frequency of the signal supplied through amplifier 81 to the input terminals of the discriminator 83 causes a change in the output voltage of the discriminator which actuates the motor 85 in the direction to advance the throttle 95, and thus to increase the vehicle motive power. Conversely, an increase of frequency results in movement of the throttle toward the closed position. The extent by which the throttle is advanced or retracted by a change of discriminator input frequency and the resulting change of discriminator output voltage is limited to a substantially proportionate change of throttle setting, because the movement of the throttle is accompanied by a change of the output voltage of the potentiometer circuit 99, 101 as required to oppose fully the change of the discriminator output voltage.

Vehicle 75, which may be the leading car or control car of an urban rapid-transit train, for example, is provided with a variable-frequency signal source such as a tunable oscillator 107, connected to supply a generated tone signal to the input terminals of the amplifier 81. A lever 109 may be attached to the frequency control dial 111 of the oscillator 107 and the lever may be normally urged by springs 113, 115 to a neutral position at which oscillator 107 produces an output signal frequency corresponding to a nearly closed throttle condition. With this arrangement, the intercoupled units 81, 83, 85, 89 and 99 cooperate as a servo system for varying the setting of the throttle 95 in a predetermined relation to the frequency of the oscillator 107, and similarly, in predetermined relation to the deflection of the lever 109.

A recorder head 117 carried upon a trolley arm 119 and adapted to cooperate with the recording medium 79 is connected to the output terminals of the amplifier 81.

An experienced, capable operator, thoroughly familiar with all peculiarities of the route over which the recording medium 79 extends, is employed to operate the vehicle 75 along the route at the optimum speeds, so that a master recording may be impressed upon the medium 79 through the recorder head 117. The operator does not directly manipulate the usual control elements 95 and 97, but instead, he controls the vehicle performance through manipulation of the lever 109 on oscillator 107. The vehicle motive power is increased by advancing the lever 109 and thus reducing the frequency of the oscillator 107, or it is decreased by retracting the lever to increase the oscillator frequency. The signal frequency applied to the recorder head 117 thus does not remain constant; instead, it varies immediately with manipulations of the master control lever 109, and hence with variations of setting of the throttle 97.

After the traversal of the medium 79 by the recorder head 117 under the influence of the amplified output of the oscillator 107, the recording medium 79 remains conditioned for automatically enabling vehicles to duplicate the performance of the first vehicle 75. Vehicle 77 (Fig. 6) is made to repeat exactly the speed variations of the preceding vehicle 75 by energization of the input circuit of its amplifier 81 through a pickup head 121 carried on a trolley arm 123. Since the amplifier 83 in each of the vehicles 75 and 77 is arranged for producing an output voltage substantially independent of the input signal amplitude, the throttle settings of the vehicles are varied substantially equally in response to equal frequency deviations of the amplified signals. Therefore, as the second vehicle 77 traverses the medium 79, the output voltage developed by the frequency discriminator carried thereby varies substantially identically with the previous variations of output of the frequency discriminator carried by the recorder vehicle 75. As a result, the throttle of vehicle 77 is made to accurately follow the settings of the throttle of vehicle 75, and so vehicle 77 duplicates the speed performance of vehicle 75 in every respect.

An amplifier circuit arrangement suitable for the amplifiers 81 in Figs. 5 and 6, and for the amplifiers 29 and 41 in Figs. 1 and 4, is set forth in Fig. 7. Two conventional resistance-capacitance coupled voltage amplifier stages 125 and 127 are followed by a power output stage 129, transformer coupled to the amplifier output terminals. Remote cut-off screen-grid or pentode tubes preferably are used in the voltage amplifier stages 125 and 127. An automatic gain control voltage generator stage 131 is provided in the amplifier, with a triode 133 having a grid circuit biased beyond the anode current cut-off point by a bias voltage source 135. A voltage source 137 is employed for maintaining the cathode of triode 133 at a predetermined negative potential below ground. The grid of tube 133 is coupled through a capacitor 139 and resistor 141 to the anode output terminal of the power output stage 129. An automatic gain control voltage drop resistor 143 and storage capacitor 145 in shunt therewith are connected between the anode of stage 131 and ground, and the anode of the gain control stage 131 is connected through grid resistors 147 and 149 to the control grids of stages 125 and 127, for increasing the negative bias voltage and thus decreasing the gain of these stages as the output voltage of the stage 129 increases.

Production of an output voltage of the desired level in the anode circuit of stage 129 results in current pulses through tube 133 of such magnitude as to maintain a normal bias voltage level across capacitor 145. A very small change of amplifier output voltage results in a relatively great change of voltage across capacitor 145, and hence a great change of gain of each of stages 125 and 127. Therefore, the output voltage level of the amplifier is held substantially constant with wide changes of input signal level.

The circuit details of a frequency discriminator 83 are set forth in Fig. 8. A first amplifier stage 151 is coupled to the discriminator input terminals by a low-pass filter which may consist simply of a series resistor 153 and a shunt capacitor 155 connected to the control grid of stage 151. A similar amplifier stage 157 is coupled to the input terminals by a high-pass filter which may also be a resistance-capacitance circuit, as with a series capacitor 159 and a shunt resistor 161. Each of the two amplifier stages 151 and 157 is provided with a transformer-coupled full-wave rectifying circuit and resistance-capacitance direct voltage output circuit, and the output circuits are connected in series opposition between the frequency discriminator output terminals.

The low-pass filter 153, 155 and the high-pass filter 159, 161 are so adjusted that an input signal of a predetermined frequency, e. g. 100 cycles per second, is equally attenuated in the two filters, so that equal voltage amplitudes are applied to the grid circuits of the two amplifiers 151 and 157 and equal output voltages result, with the rectified output voltages cancelling to provide zero net output. An input signal of a higher frequency is attenuated less in filter 159, 161 than in filter 153, 155, and accordingly the direct voltage developed across output capacitor 162 exceeds that across output capacitor 163, with the result that a net output voltage is developed between the frequency discriminator output terminals, of a polarity corresponding to the voltage polarity across capacitor 162. An input signal of a frequency lower than the predetermined frequency, on the other hand, produces a net output voltage of the opposite polarity.

In the foregoing illustrations, the present invention has been described principally as embodied in railway vehicles. In Figs. 9 and 10 it is shown applied to steerable vehicles such as automobiles. In the automobile versions, the speed signal and auxiliary signal features of Figs. 1–6 may be retained along with steering control features here described.

Fig. 9 illustrates forward portions of an automobile undercarriage, including the front axle portion 167 and a longitudinal portion of the frame, the front wheels 169 and 171 on bearing members pivoted in the frame member 167 for steering deflections, and knuckle arms 173 and 175 fixed to the wheel bearing members and interconnected by a tie rod 177. Steering gear mechanism 179 is mounted on the frame at the terminus of the steering column 181 and is connected to the tie rod 177 by a connecting link 183.

A flexible recording medium such as a wire 184' adapted for magnetic recording is carried by a reel 185 upon the automobile, and is passed through a guide 187 and a magnetic recorder head 189 and thence over a pulley 191 arranged just at the level of the roadway paving to lay the recording medium upon the road surface during the progress of the vehicle. The pulley 191 and recorder head 189 are carried upon a forwardly extending arm 193 pivoted at 195 about a vertical axis through the frame member 167. The arm 193 includes a rearwardly extending part slotted at 197 for engaging a pin in the tie rod 177.

As the vehicle of Fig. 9 travels along the roadway, speed signal recording equipment of the type shown in Fig. 5 operates through the recorder head 189 to impress a record upon the medium 184' for speed reference by vehicles subsequently travelling along the roadway; and the recording medium is at the same time laid along the roadway in lateral position for steering guidance of the subsequently travelling vehicles, the path of the medium-laying pulley 191 moving generally to the right or to the left with the general trends of movement of the vehicle, and being additionally deflected immediately to the right or to the left as the steering gear deflects the wheels in steering to the right or left.

Fig. 10 illustrates forward portions of an automobile under-carriage, including the front axle member 168 of the frame, the front wheels 170 and 172 on bearing members pivoted in the frame member 168 for steering deflections, and knuckle arms 174 and 176 fixed to the wheel bearing members and connected together by a tie rod 178. Steering gear mechanism 182 is mounted on the frame at the terminus of the steering column and is connected to the tie rod 178 by a connecting link 184.

A pair of similar pickup coils 201 and 203 are arranged at opposite sides on a forwardly extending arm 194 pivoted at 196 about a vertical axis through the frame member 168. The arm 194 includes a rearwardly extending part slotted at 198 for engaging a pin in the tie rod 178. The assembly of pickup coils is thus coupled to the steering assembly of the vehicle in Fig. 10 in the same manner as the coupling of the recorder head and medium-laying apparatus to the steering assembly in the vehicle of Fig. 9.

A servo system is provided on the vehicle in Fig. 10 for operating the steering system thereof in such a way as always to maintain pickup coils 201 and 203 symmetrically disposed above the prepared recording medium indicated by the curving broken line. Such a servo system may take the form of a motor 205 coupled to the steering control shaft 207 as through a gear train 209, and amplifier means for reversibly controlling the motor 205 according to the difference of strength of the signals developed in the left-hand coil 201 and the right-hand coil 203, the amplifier and motor connections being sensed for deflecting the steering system and the pickup assembly to the right when the signal strength in pickup coil 203 exceeds that in pickup coil 201, and to the left when the signal strength in pickup coil 201 exceeds that in coil 203.

The amplifier means for controlling the motor 205 may comprise a phase-detector-amplifier stage 211 in which a pair of amplifier tubes 213 and 215 have their control electrodes or grids connected for opposite-phase excitation as through a transformer 217 having its primary winding energized by the output circuit of a signal amplifier 219. The input circuit of amplifier 219 is connected to pickup coils 201 and 203, which are connected in series opposition. These coils provide cophasal signals at their outer ends with respect to the common connection between them, and the resultant signal is thus zero when the coils are symmetrical about the recording medium. When the coils depart from the position of symmetry, the voltage induced in the one nearer the medium exceeds that in the opposite coil, and a net difference output voltage is therefore supplied between the input terminals of amplifier 219, of amplitude dependent upon the extent of departure from symmetry and of one phase or the opposite phase dependent upon whether the departure is to the left or right. A further pickup coil 221 is positioned neutrally between coils 201 and 203 for developing a phase reference voltage during the movement of the vehicle. This coil 221 is connected to the input circuit of an amplifier 223, which may be of the type illustrated in Fig. 7. Output voltage from amplifier 223 is applied cophasally in the grid circuits of the tubes 213 and 215 in unit 211, as through a transformer 225 having its secondary winding connected between the secondary center-tap terminal of transformer 217 and a grid-bias source 227 connected to the cathodes of tubes 213 and 215.

The amplitude-limited output of amplifier 223 is employed not only for reference-phase excitation of the phase-detector-amplifier unit 211 but also for cooperating with speed control servo apparatus 229 which includes a frequency discriminator of the type shown in Fig. 8 and throttle servo motor and potentiometer elements of the type shown in Fig. 6.

The anodes of tubes 213 and 215 are supplied through resistors 231 and 233 by an anode power source 235. The anodes are connected to the field supply terminals of motor 205, and the armature power for the motor is supplied by a source 237.

The steerable vehicles of Figs. 9 and 10 provide the advantages of accurate speed performance duplication as achieved in the vehicles of Figs. 5 and 6 combined with accurate steering performance duplication. The vehicle of Fig. 9 simultaneously prepares the recording medium with space-alternations for speed reference of subsequent vehicles and positions the recording medium along the path for guidance of the subsequent vehicles. The number of cycles per unit length along the recording medium is varied not only with variations of the speed of the recording vehicle, but also with variations of the position of the speed control member or members of the vehicle. The lateral positioning of the recording medium relative to the center line of the roadway or vehicle path varies not only with the lateral component of movement of the recording vehicle, but also with the movement of the steering control apparatus on the vehicle. As a result, the accuracy with which the subsequent vehicle of Fig. 10 duplicates the performance of the recording vehicle may be made to approach perfection when the speed and steering servo systems of the vehicle 10 are made to respond promptly to changes of frequency and to changes of the differential output from the side coils 201 and 203.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A method of preparing a recording for enabling the progress of a first steerable, variable-speed vehicle along a path to be duplicated by a further vehicle, comprising operating said first vehicle along said path with steering and speed varied according to the character of successive parts of the path, and recording a chain of space-alternations and positioning said recorded chain of space-alternations along said path generally along the course traversed by said first vehicle, the number of said space alternations per unit length along a portion of said path being varied jointly according to the speed and the motive power of said first vehicle, and the lateral position of said chain of space alternations being varied jointly according to the course and the steering deflection of said first vehicle, said step of recording a chain of space alternations comprising generating an alternating signal, varying the frequency of said signal in predetermined relation to the motive power of said first vehicle, and recording said signal during the movement of said first vehicle.

2. A process of preparing a recording of the performance of a first controllable vehicle in progress along a path for enabling a second vehicle to duplicate the performance of said first vehicle, comprising operating a progress control element of said first vehicle and thereby altering its progress for maintaining optimum performance along successive portions of said path, recording the progress of said vehicle on a recording medium along said path with changes in the vehicle progress represented by corresponding changes in a predetermined characteristic of the recording, the changes in said predetermined characteristic being further modified according to operation of said progress control element, said first controllable vehicle comprising a vehicle having a speed control throttle member comprising said progress control element, said step of recording the progress of said vehicle in a recording medium comprising impressing significant space-alternations along said recording medium with the number of space alternations per unit length therealong normally varied as a predetermined function of vehicle speed, and said further modification of said predetermined characteristic comprising the modification of the relation between the number of space alternations per unit length and the vehicle speed according to changes of adjustment of said vehicle speed control throttle member.

3. A process of preparing a recording of the performance of a first controllable vehicle in progress along a path for enabling a second vehicle to duplicate the performance of said first vehicle, comprising operating a progress control element of said first vehicle and thereby altering its progress for maintaining optimum performance along successive portions of said path, recording the progress of said vehicle on a recording medium along said path with changes in the vehicle progress represented by corresponding changes in a predetermined character-istic of the recording, the changes in said predetermined characteristic being further modified according to operation of said progress control element, said first controllable vehicle comprising a vehicle having a steering control member comprising said progress control element, said step of recording the progress of said vehicle in a recording medium including the step of fixing the positional relation of the recording medium relative to said path according to the course of movement of said vehicle relative to said path, and said further modification of the changes in said predetermined characteristic comprising variation of the lateral position of said medium relative to said vehicle according to changes of adjustment of said steering control element.

4. A method of preparing a signal storage along a vehicle path, comprising operating a steerable vehicle along said path, carrying a supply of recording medium on said vehicle, impressing signal variations on said medium and depositing said medium generally along the line of movement of said vehicle, and superimposing lateral deflections of said medium relative to the line of movement of said vehicle according to steering deflections of said vehicle.

5. A method of preparing a vehicle speed signalling recording medium along a vehicle path, comprising operating a speed controllable vehicle along said path, varying the vehicle speed for optimum speeds along said path, and impressing upon said recording medium signals representing the speed of said vehicle along said path and laterally positioning said impressed recording medium along the line of travel of said vehicle during movement of said vehicle along said path, said last step including the variable lateral deflection of said medium relative to said vehicle.

6. Apparatus for denoting the progress of a vehicle relative to a recording medium extending along a vehicle path and characterized by space alternations therealong, comprising: pickup means carried by said vehicle and movable relative to said vehicle for travelling along said recording medium as said vehicle traverses said path for producing alternating signals of frequency dependent upon the speed of movement of said vehicle, said pickup means including means for producing a first signal and a second signal as said vehicle traverses said path, means coupled to said pickup means and responsive to said first signal for varying the motive power of said vehicle according to the number of alternations per unit length along said recording medium, and means coupled to said pickup means and jointly responsive to said first signal and said second signal for varying the deflection of said pickup means to right or left from its neutral position relative to said vehicle according to relative variations of said signals and for varying the steering of said vehicle in accordance therewith, said last-defined means comprising means including a mechanical coupling between said pickup means and the steering mechanism of said vehicle for maintaining a predetermined relation between the vehicle steering and the deflection of said pickup means from the neutral position thereof.

7. Apparatus as defined in claim 6, wherein said means coupled to said pickup means for varying the position of said pickup means comprises phase-responsive means for varying the position of said pickup means according to the relative phase of said first and second signals.

8. Apparatus for preparing a vehicle signalling recording medium according to the speed and course of movement of a steerable vehicle, comprising means for recording an alternating signal in successive parts of said medium during movement of said vehicle and positioning said recording medium generally along the course of movement of said vehicle, means for simultaneously deflecting said recording medium relative to said line of movement and deflecting the steering of said vehicle in coordinated relation, and means for simultaneously varying the motive power of said vehicle and the frequency of the signal recorded.

9. Apparatus for preparing a vehicle signalling recording medium according to the speed of movement and the motive power exerted on a vehicle, comprising recording means carried by said vehicle, said recording means being arranged for relative movement with respect to said medium at a speed varying according to the speed of movement of said vehicle, means for applying to said recording means an alternating signal of substantially constant frequency during operation of said vehicle at substantially constant speed and power, and means for varying the frequency of said signal as a predetermined function of variations of motive power of said vehicle, said recording means including means for impressing upon said medium a lasting record of said signal.

10. A method of causing a second steerable vehicle with a steering control to travel along a path with progress variations substantially duplicating those of a first or pilot steerable vehicle with a steering control, comprising operating the first vehicle along the path, laying a continuous-strip recording medium generally along the path with lateral displacement relative to the first vehicle according to the steering control displacement of the first vehicle as it progresses along the path, operating the second vehicle along the path, and deflecting the steering control of said second vehicle according to relative lateral displacement between said second vehicle and said medium.

11. The method of causing a second steerable vehicle to travel along a path with progress variations substantially duplicating those of a first or pilot steerable vehicle as defined in claim 10, further including the steps of impressing upon said recording medium adjacent the first vehicle as it progresses therealong regular variations signifying the variations of speed of said first vehicle, detecting said impressed variations as said second vehicle traverses them in its progress, and varying the speed of said second vehicle according to the detected variations.

THOMAS M. FERRILL, Jr

References Cited in the file of this patent

UNITED STATES PATENTS

| Number | Name | Date |
|---|---|---|
| 1,042,944 | McLeer et al. | Oct. 29, 1912 |
| 1,490,253 | Blosky | Apr. 15, 1924 |
| 1,826,492 | Babson | Oct. 6, 1931 |
| 1,928,551 | Ball | Sept. 26, 1933 |
| 2,058,523 | Stearns | Oct. 27, 1936 |
| 2,098,401 | Prescott | Nov. 9, 1937 |
| 2,178,237 | Linder | Oct. 31, 1939 |
| 2,236,431 | Hollingsworth et al. | Mar. 25, 1941 |
| 2,239,395 | Mallory | Apr. 22, 1941 |
| 2,248,473 | Franklin | July 8, 1941 |
| 2,317,400 | Paulus | Apr. 27, 1943 |
| 2,493,755 | Ferrill | Jan. 10, 1950 |
| 2,576,424 | Sunstein | Nov. 27, 1951 |